United States Patent [19]

Becker et al.

[11] Patent Number: 4,490,401
[45] Date of Patent: Dec. 25, 1984

[54] PASTEURIZATION METHOD

[75] Inventors: Kenneth W. Becker, Brookfield; Louis G. Friedrichs, Jr., Milwaukee; Lev Kropp, Glendale; Richard B. Straka, Milwaukee, all of Wis.

[73] Assignee: Miller Brewing Company, Milwaukee, Wis.

[21] Appl. No.: 555,501

[22] Filed: Nov. 28, 1983

Related U.S. Application Data

[62] Division of Ser. No. 388,211, Jun. 14, 1982, Pat. No. 4,441,406.

[51] Int. Cl.$^3$ .................... B65B 55/00; A61L 2/04
[52] U.S. Cl. .................... 426/407; 426/521
[58] Field of Search .............. 426/521, 401, 407, 412; 99/467, 359, 470, 361, 362, 367, 368, 370, 483, 452, 453, 275; 422/25, 304; 165/66

[56] References Cited

U.S. PATENT DOCUMENTS 3,622,357 11/1971 Tillman .................. 99/249
4,263,254 4/1981 Huling .................. 99/362
4,279,858 7/1981 Huling .................. 99/362
4,331,629 5/1982 Huling .................. 99/362

Primary Examiner—George Yeung
Attorney, Agent, or Firm—Quarles & Brady

[57] ABSTRACT

The over-pasteurization of a product in a tunnel pasteurizer can result when the normal movement of the product through the pasteurizer is delayed. Over-pasteurization is prevented by cooling the product in the pasteurizing zone to reduce its temperature to a temperature at which no appreciable pasteurization occurs. The temperature of the product may be returned to pasteurizing temperatures when the delay no longer exists. An improved tunnel pasteurizer is described for preventing over-pasteurization by spraying the product with cool water to reduce its temperature. The preferred pasteurizer also includes an automatic level control system for the regenerative paired zones, an external water tank to recover and reuse energy and water usually wasted and a closed cooling system which provides for cooling of the pasteurizer water without the risk of cross-contamination of the cooling source and the pasteurizer.

3 Claims, 6 Drawing Figures

PASTEURIZATION METHOD

This is a division of application Ser. No. 388,221, filed June 14, 1982, now U.S. Pat. No. 4,441,406.

FIELD OF THE INVENTION

The present invention relates to pasteurization and more particularly to the pasteurization of containers of malt beverages.

BACKGROUND OF THE INVENTION

Pasteurization is the process whereby microbiological organisms are inactivated to promote stability and improve the shelf life of beer. Pasteurization is accomplished by heating the product to approximately 140° F. for a predetermined period of time. Under-pasteurization may result in less than complete destruction of organisms. Over-pasteurization may result in flavor changes.

Pasteurization has progressed from simple but labor intensive methods to completely automated methods. Newer methods generally utilize either bulk pasteurization or tunnel pasteurizers.

Bulk pasteurization is the process of pasteurizing beer before it is packaged in a container. This method requires sterile filling equipment and does not prevent biological contamination from being introduced by the container.

Tunnel pasteurizers utilize the principle of conveying the package through heating and cooling zones, during which time the packages are subjected to sprays of water. The temperatures of the water sprays are predetermined and controlled such that each successive zone further heats the product up to a determined holding temperature. After the product is subjected to a constant temperature for a specific period of time, it proceeds through a series of cooling zones during which the product temperature is systematically lowered to a desired beer out temperature.

The most commonly used method of conveyance through a tunnel pasteurizer is by means of a walking beam. Walking beams utilize grate strips which rise and advance a nominal distance before lowering and depositing the product on a separate series of grate strips. This second series of grate strips can rise and advance the product while the first series of grate strips is returning to its original position or it can remain stationary while the first series of grate strips is lowering and returning to its original position prior to beginning a new cycle.

Water spray systems, including volumes, spray patterns and water distribution systems will vary depending on the pasteurizer manufacturer. Heating is required to elevate product temperature to the proper pasteurization temperature and is typically accomplished by using steam or hot water in either direct injection or indirect heating (heat exchanger) mode. Cooling is required to lower product temperature to an acceptable level before labeling, packing and storing. Cooling is typically accomplished by the direct injection of a cooling medium. This medium can be water utilized at the "as received" temperature or water which is recycled and cooled mechanically in a cooling tower or water chiller.

Early pasteurizers made little or no attempt to conserve or reuse the energy expended in heating and cooling the product during the pasteurization process. Initial attempts at conserving resources and energy resulted in energy regeneration. Regeneration couples a cold zone and a hot zone into a closed loop called a regenerative pair. The spray water is cooled as it heats up cool product before being pumped to its regenerative pair. In this paired zone, the cooled spray is heated up as it cools the hot product before being pumped to the cold zone. This heat transfer system is called regeneration. Pasteurizers can be provided with as many regenerative pairs as desired. Economic justification becomes difficult at five or more regenerative pairs.

Tunnel pasteurizers inherently possess advantages and disadvantages. The pasteurizers perform a relatively simple function in a complex manner. Heating and cooling containers is simple. Regeneration of energy and the associated heat balances are complex.

The following is a list of problems associated with tunnel pasteurizers and a short discussion of each:

(a) Under-pasteurization—Under-pasteurization is a relative term which is dependent on the biological condition of the product being packaged, the cleanliness of the container, and the level of assurance required by the manufacturer. While 2–3 pasteurization units (PU's) is generally adequate in destroying microbiological contaminants, most brewers establish a minimum PU limit between 5–10 PU. Underpasteurization most often occurs unknowingly: i.e., failures in the heating controls, product advanced too quickly through the heating and holding zones or faulty spray water distribution.

(b) Over-pasteurization—Over-pasteurization occurs more frequently than under-pasteurization since brewers would rather err on the high side, and control equipment is designed to fail accordingly. Downsteam delays force the pasteurizer to stop. When the pasteurizer stops, the product which has been heated to approximately 140° F. continues to pasteurize and will continue to do so until the product has been cooled to nominally 120° F. e.g. a ten minute delay at 145° F. will add over 25 PU to the product. Failure of heating controls and faulty calibration also can cause over-pasteurization.

(c) Water Consumption And Waste—Typically, pasteurizers with three or less regeneration pairs require continuous additions of cooling water. When utilities were cheap, this water was normally injected where needed in the pasteurizer, allowed to overflow from the machine, and was sewered. Typically today, this overflowing water is collected, recooled and recycled to the pasteurizers. To insure that water is maintained in each sump at an adequate level, manual make-up water valves are often left open. This practice caused water to eventually overflow to a sewer or a reclaim system where it may or may not have been excess.

(d) Heat Waste—As discussed in (c) above, excess water overflowing at a higher temperature than when injected becomes a source of heat waste. Normally, a "balanced" pasteurizer will require continuous addition of heating energy. When no product is in the hot side of a regenerative pair, more heating energy must be provided to compensate for the heating normally accomplished by the hot product which is being cooled. This extra heating is also required if less product is in the hot regenerative pair than is in the cold regenerative pair. This condition is an "unbalanced" machine.

When the pasteurizer is being filled with product (run-in) at the beginning of a day or shift, the hot end is completely empty and the heating normally provided by the hot product must be supplied by steam or heated water. This extra heat required during run-in is eventually lost and is considered a "necessary" waste of heating energy.

(e) Cooling Energy Waste—As stated in (d) heating energy is wasted during run-in. Conversely, when it is time to empty the machine, large amounts of cooling energy are required to replace the cool product which normally is entering the pasteurizer. This cooling requirement is also eventually lost and is considered a "necessary" waste of cooling energy.

(f) Simultaneous Heating And Cooling Energy Waste—If the supply of product to the pasteurizer is delayed the beginning of a run-out will occur. When product supply resumes, a gap or space void of product will have been formed in the pasteurizer. A series of such gaps frequently results in external heating and cooling being provided simultaneously in a regeneration pair. This situation is a common source of cooling and heating energy waste.

(g) Beer Waste And Losses—The primary causes of beer waste and losses are over and under-pasteurization, tipped and broken containers. The causes of the first two have already been discussed. Tipped containers caused by the previously mentioned gaps cause machine and conveyor jams and are thus damaged and wasted. An indirect result of broken or leaking containers is organic contamination of the cooling source which will result in cross-contamination of one or more pasteurizers. Broken bottles normally result from thermal shock which is caused when hot or cold product enters a successive zone that is either too cold or too hot, respectively. The temperature difference between the spray water and the outer surface bottle when excessive causes thermal shock. Generally, if water spray temperature is 80° F. hotter or 40° F. cooler than the bottle skin temperature, thermal shock will result.

OBJECTS OF THE INVENTION

It is the primary object of the present invention to disclose a method of preventing the over-pasteurization of a product, such as beer, in a tunnel pasteurizer.

It is also an object to disclose an improved tunnel pasteurizer for preventing such over-pasteurization.

It is another object of the present invention to disclose a method and apparatus for recovering and reusing energy and water which would normally be lost during the emptying (run-out) and filling (run-in) of a pasteurizer with product.

It is a further object to disclose a closed-loop cooling system for a tunnel pasteurizer which provides for the required cooling of the pasteurizer water without cross-contaminating the source of cooling and/or the pasteurizer.

Furthermore, it is an object of the invention to disclose an automatic level control system for regenerative paired zones in a tunnel pasteurizer for the purpose of saving water, heat and refrigeration effect.

Other objects and advantages of the invention will become apparent from the description which follows:

BRIEF SUMMARY OF THE INVENTION

The present invention relates to a method of preventing the over-pasteurization of containers of malt beverages in a tunnel pasteurizer when the flow of containers through the pasteurizer stops and there are containers still in the pasteurizing zones. The invention also relates to an improved tunnel pasteurizer for accomplishing the forementioned objects of the invention.

The inventive method of preventing over-pasteurization comprises cooling the containers in the pasteurizing zones by spraying them with cooling water to reduce the internal temperature of the product in the containers to a temperature at which no appreciable pasteurization occurs and holding the containers at that temperature until operations resume. In the preferred embodiment of the pasteurizer of the present invention, the cooling of the product in the containers is accomplished by spraying them with cooling water. The above operation is referred to hereinafter as the cool down mode.

The preferred pasteurizer also has an external water storage system which makes it possible to recover and reuse energy normally lost during the emptying (run-out) and filling (run-in) of the pasteurizer with product. In the preferred pasteurizer, one or more external storage tanks are provided to store water which has been heated by the containers and which would normally be discarded during run-out. The stored heated water is used to provide the heat necessary to elevate the temperature of water being pumped to the preheat zone at the next run-in. Similar external storage tanks are used to recover and store water which has been cooled indirectly by the containers thus recovering the refrigeration effect. This water is used to provide the cooling water which is required in the next run-out. If desired, a single storage tank may be used to alternately store the heated and the cooled water.

The preferred pasteurizer also has heat exchanger means which is used to cool the water from the storage tank to the desired temperature for use by the precool zone spray heads. A closed-loop cooling system including the above heat exchanger is provided which permits pasteurizer water to be cooled without being mixed with water from an external cooling source which could result in cross-contamination.

The preferred pasteurizer also has an automatic level control system for each of the regenerative paired zones which share the same water in a closed loop pumped circuit. This automatic level control system replaces the equalization pipe which is normally used to connect two regenerative zones below the normal sump water level and which compromises the intentional temperature differences between the paired sumps.

BRIEF DESCRIPTION OF THE DRAWINGS

The invention is illustrated in the accompanying drawings wherein.

DESCRIPTION OF THE PREFERRED EMBODIMENT

Figure 1:
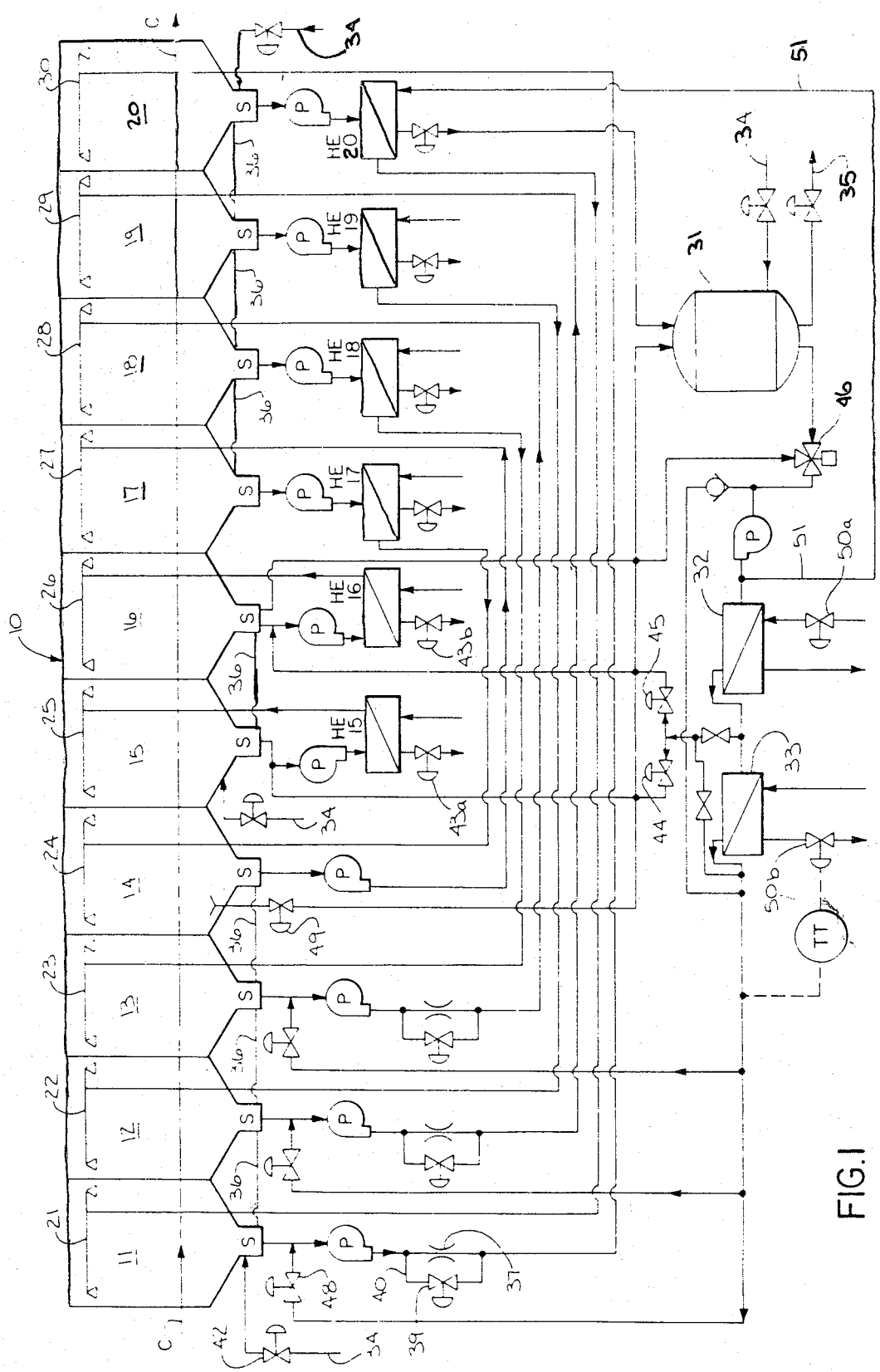
FIG. 1 is a schematic view of a preferred embodiment of the pasteurizer of the present invention.

In the preferred embodiment of the invention shown in FIG. 1 there is seen a tunnel pasteurizer 10 which has ten heating and cooling zones 11-20. Zones 11, 12, 13 and 14 are preheat zones. Zone 15, which is a heating zone, and zone 16, which is a holding zone, are the pasteurizing zones and zones 17, 18, 19 and 20 are precool zones.

The containers of the product pass through zones 11-20 of the tunnel pasteurizer 10 on a walking beam or other conveying means C. In zones 11, 12, 13 and 14, the containers are sprayed with progressively hotter water from spray heads 21, 22, 23 and 24, respectively, to bring the temperature of the product in the containers up to the desired levels. In the heating zone 15 and the holding zone 16, the temperature of the product in the containers is raised to and maintained at a pasteurizing temperature by spraying the containers with hot water of sufficient temperature from spray heads 25 and 26. In the precool zones 17, 18, 19 and 20, the containers of the product are sprayed with progressively cooler water from spray heads 27, 28, 29 and 30 to cool the product in the containers to an acceptable level before labeling, packing and storage.

The tunnel pasteurizer 10 of FIG. 1 is a regenerative pasteurizer with four pairs of regenerative zones. Each regenerative pair shares the same water and includes a precool zone and a preheat zone coupled into a pumped closed loop. Zones 11 and 20 are joined by pipes to form one pair; zones 12 and 19 are similarly connected to form a second pair; zones 13 and 18 are likewise connected to form a third pair; and the fourth pair has zone 14 and zone 17 coupled together. Within a regenerative pair, the spray water which is cooled as it heats up the incoming cool product in the preheat zone is collected in a sump, pumped to the precool zone spray head and used to cool the hot containers entering the zone. The same water, after it has been heated as it cools the outgoing hot product, is collected in the precool zone sump and returned to the preheat zone sprays for use in heating incoming product. If necessary, the temperature of the water may be raised to a higher temperature using a heat exchanger (HE17-HE20 in FIG. 1). The pasteurizer 10, as seen in FIG. 1, also includes connecting pipes, pumps (P) and valves for conducting and controlling the water flow within the paired zones, a storage tank 31, a cooling heat exchanger 32, a chilling heat exchanger 33, and make-up water supply lines 34 and drain pipes 35.

The pasteurizer 10 is filled by injecting water into zones 11, 15 and 20 and the overflow storage tank 31 using the make-up water lines 34. The water injected into zone 11 will also fill zones 12, 13 and 14 by means of the interconnecting pipes 36 between the sumps S. Zone 16 is filled via an interconnecting pipe 36 by injecting water into zone 15. Zones 17-19 will be filled by means innerconnecting pipes 36 between the zones with water injected into zone 20. Level controls in zones 11, 15 and 17 and the overflow tank 31 shut off incoming water flow when the desired water level is satisfied.

During normal operation, make-up water to replace that carried out on the containers will be injected as required into zones 11 and 15 and the overflow tank 31. Level controls at these points will control the addition of water.

Figure 2:
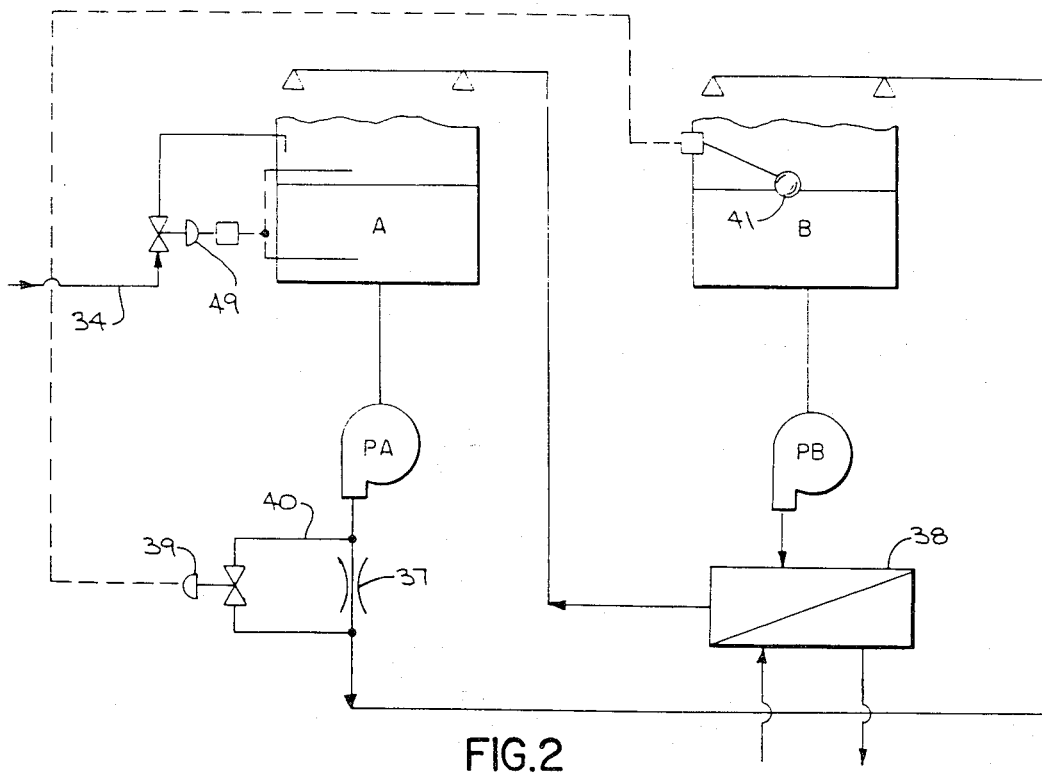
FIG. 2 is a schematic view showing the automatic level control system of the pasteurizer of the present invention.

To avoid compromising the intentional temperature difference between the zones of a regenerative pair, the pasteurizer 10 has an automatic level control system for each regenerative paired zone. As seen best in FIG. 2, the regenerative paired zones are a preheat zone A and a precool zone B which share the same water in a closed loop pumped circuit.

Pumps PA and PB must pump at exactly the same volume to maintain constant levels in sumps A and B. If these pumps are pumping different volumes, one sump will overflow and the other sump will empty. To maintain equal pumped volume, the volume of pump PA is controlled. This control includes a fixed flow orifice 37 which is installed on the pump PA discharge. This orifice 37 is sized to duplicate the pressure drop caused by the heat exchanger 38 located on the pump PB discharge. A modulating control valve 39 is installed in a pipe 40 which by-passes the fixed-flow orifice 37. When the fixed-flow orifice 37 is properly sized, the modulating control valve 39 will operate at a mid range position. The flow from pump PA to the zone B spray may be modulated by any other means.

A float level control 41 is located in sump B. This float will maintain a set (constant) level in sump B. If pump PA, for any reason, begins to pump more volume than pump PB, the level in sump B will begin to rise. The rise in level will raise the float 41. Raising the float 41 causes the modulating control valve 39 in the fixed orifice by-pass pipe 40 to close slightly, reducing the flow to the sprays of zone B, thus stabilizing the level of sump B. Any water loss from the paired zones A and B will result in a lower level in sump A. The proper level will be restored by makeup water through a level control valve 42 on makeup line 34.

Conversely, if pump PB is pumping more volume than pump PA, the level in sump B will begin to fall. As the float 41 lowers below the set point, it will begin to open the modulating valve 39 on the by-pass pipe 40, increasing the flow to zone B sprays. When this increased flow raises the level in sump B to the set level, the modulating valve 39 will return to its normal mid-range position.

This automatic level control system replaces an equalization pipe which in prior art pasteurizers connected the two regenerative zones below the normal sump water level. A higher level in one sump would equalize through this pipe to the paired sump. This method compromised the intentional temperature differences in the two paired sumps.

The tunnel pasteurizer 10 is normally an integral part of a packaging line including filling (upstream), pasteurizing and packing (downstream) operations. As a result, when there is a downstream delay the line may stop with product in the pasteurizing zones. If the product remains too long at pasteurizing temperatures over-pasteurization of the product can occur. Upstream delays and subsequent restarts can cause a gap in the container mass within the pasteurizer. A run-out and subsequent run-in caused by such a gap consumes significant amounts of energy; therefore, it may be more desirable to stop the flow of the line with product still in the pasteurizer when an upstream delay occurs. This, of course, also creates the risk of over-pasteurization. To prevent over-pasteurization from occurring when the walking beam C is delayed or stopped for any reason, the pasteurizer 10 is provided with means for cooling down any product in the pasteurizing zones to a temperature at which no appreciable pasteurization occurs.

Figure 3:
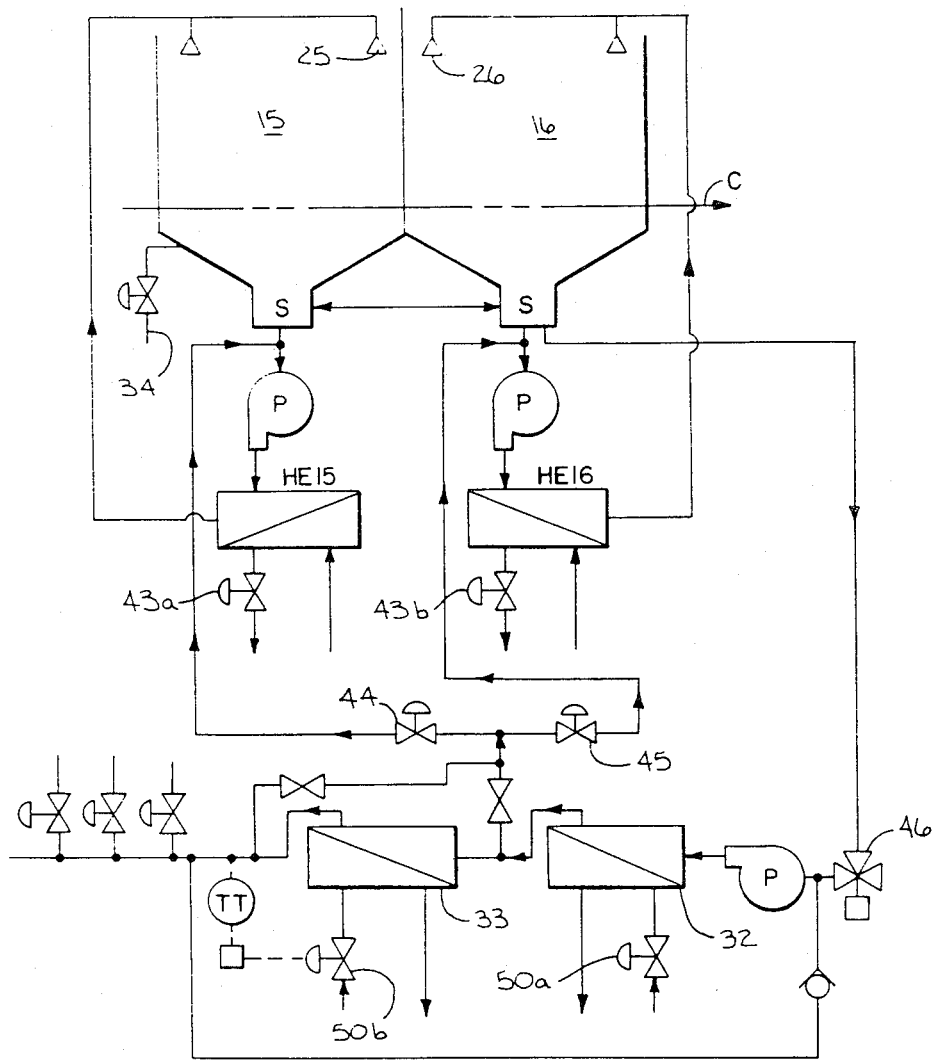
FIG. 3 is a schematic view showing the portions of the pasteurizer of FIG. 1 that are involved in the cool down mode.

The cool-down mode will be described in connection with FIG. 3.

When the walking beam C in the pasteurizer stops, the temperature of the product in the heating and holding zones 15 and 16 is within the range of pasteurization temperatures. Even if the spray water is turned off, the product continues to pasteurize because it remains within the range of pasteurization temperatures. In the pasteurizer of the present invention over-pasteurization is prevented by cooling the product to a temperature at which no appreciable pasteurization occurs, e.g., below 120° F.

Zones 15 and 16 are provided with temperature controllers which are multiple set point controllers. A higher set point controls the spray temperature during normal operating conditions. When a delay occurs causing the walking beam C to stop, the set point of the zone 15 and 16 controllers, responding to a control signal will drop to a lower temperature, preferably after a preset time delay. If the delay clears before the set period of time has lapsed, the cool-down step is avoided. Controls are provided to maintain product and sump temperature at a temperature at which no appreciable pasteurization occurs. At the lower temperature setting, each zone controller controls valves 44 or 45, respectively, which control the supply of cooling water to the zone 15 and 16 pump suction headers, respectively. Zones 15 and 16 are connected by an equalizing line or pipe 36 between the sumps below the normal water level to accommodate level equalization during a cool-down cycle. Zone 16 sump water flows to the cooling heat exchanger 32 only during cool-down when an automatic three-way valve 46 is open to the sump. The cooling water is water from the zone 16 sump which has been pumped through the cooling heat exchanger 32 and cooled as much as possible using only water from a cooling tower. When product and the sumps in zones 15 and 16 are below 120° F., the cooling stops. Product can remain at this temperature without accumulating excessive pasteurization units (PU's). When the delay situation has cleared, the zone 15 and 16 controllers responding to a control signal will return to the normal temperature setting and transfer control to valves 43a and 43b, respectively. The spray water will be heated to the desired normal (higher) level in the heat exchangers HE15 and HE16, respectively. The walking beam can then either be started immediately or after sump and product are at normal operating temperatures. In the preferred embodiment the control signal to which the zone 15 and 16 temperature controllers respond is generated by a programmable controller.

The purpose of the cool-down/heat-up capability is to prevent over-pasteurizing during downstream delays and to eliminate energy consuming run-outs and resulting run-ins during upstream delays while preventing over-pasteurization of the product if the walking beam is stopped.

The cool-down/heat-up capability discussed is an energy saving feature since it prevents both the run-out/run-in cycle and gaps. Run-outs and run-ins consume large amounts of energy relative to the amount required for cool-down and heat-up. For example, a cool-down/heat-up cycle for a 12 oz. can pasteurizer operating at 2,000 cans per minute only requires 28% of the energy needed for a complete run-out/run-in cycle. Energy use is kept at a minimum by using only cooling tower water for this operation rather then mechanically chilled water.

Figure 4:
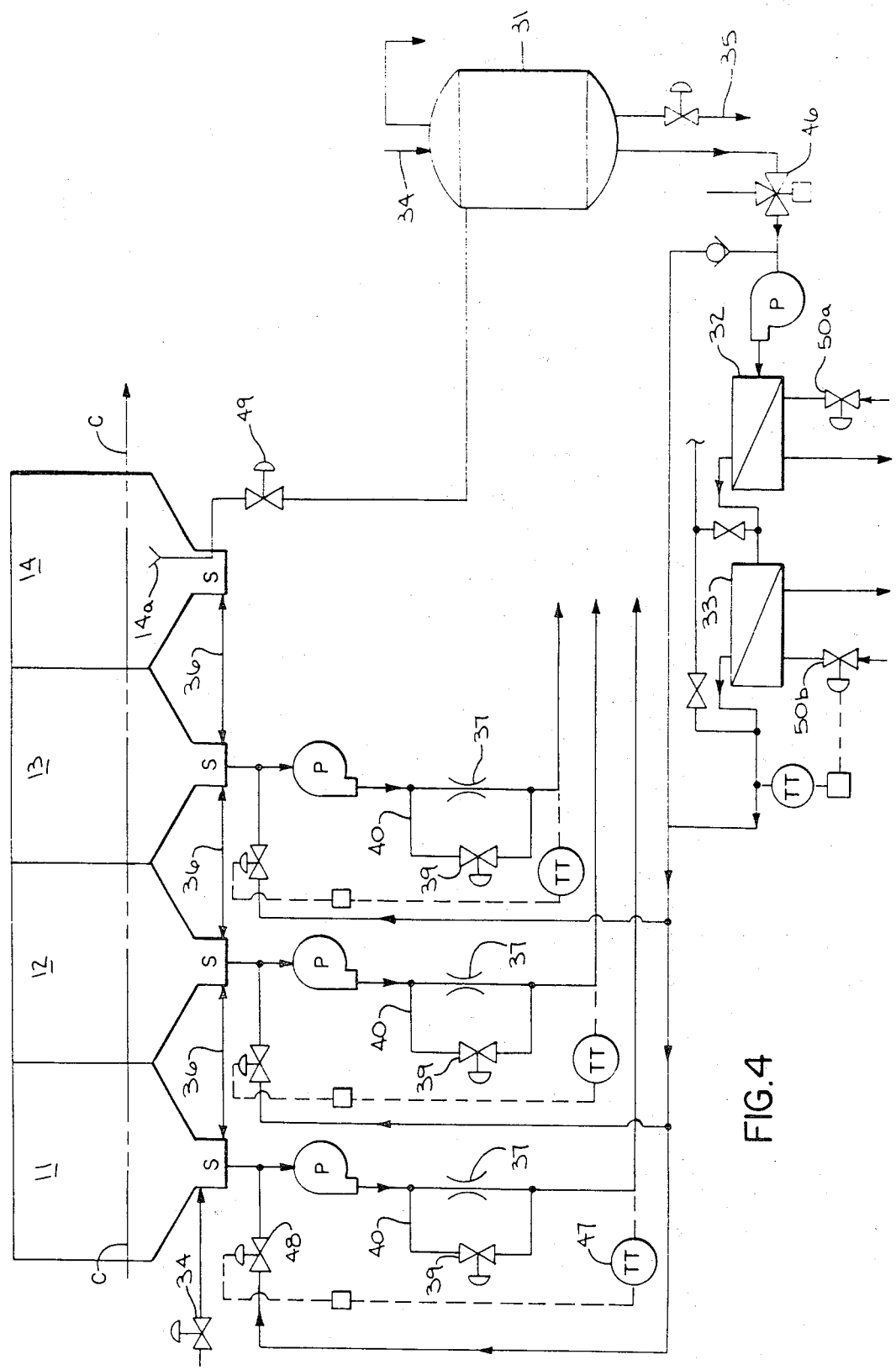
FIG. 4 is a schematic view showing the portions of the pasteurizer of FIG. 1 involved in the run-out mode.

The run-out of the pasteurizer 10 will be described in detail in connection with FIG. 4.

If for some reason the pasteurizer 10 must be emptied, the run-out is initiated manually by the operator. As run-out commences, the temperature transmitter 47 in the zone 11 pump discharge will sense a temperature rise and will begin to open the cooled water control valve 48. Cool water from storage tank 31 which was derived from the previously run-in, further cooled in the cooling heat exchanger 32 and, if needed by the chilling heat exchanger 33, is injected into the pump suction of the zone 11 pump to maintain the proper temperature. Similar injections of cooling water occur in zones 12 and 13. These injections of water will cause sump levels in zone 11, 12 and 13 to rise and to cumulatively overflow into zone 14 and to overflow at the outlet 14a and to flow by gravity or to be pumped through valve 49 to the overflow tank 31 at approximately the zone 14 sump temperature. Thus the cool water in tank 31 has been replaced by warm water to be stored for use in the next run-in.

Still referring to FIG. 4, the operation of cooling heat exchanger 32 and chilling heat exchanger 33 will now be described.

In the cooling heat exchanger 32, cooling tower water on the cold side, controlled by valve 50a, is used to reduce the pasteurizer water temperature as much as possible. The temperature of this tower water will be as low as the outside weather conditions will permit. Ideally, the tower water will be cold enough to reduce the pasteurizer water temperature to the required temperature. A chilled water temperature control valve 50b is controlled by the temperature of pasteurizer water leaving the chilling heat exchanger 33 and is enabled only when run-out has been manually initiated. The cooled pasteurizer water is then reinjected into the appropriate pump suction as required for cooling, never having mixed with the cooling tower or mechanically chilled water. As a result, there is no possibility of cross-contamination occurring. The cooling heat exchanger 32 is reserved for cooling with cooling tower water and the chilling heat exchanger 33 utilizes mechanically chilled water.

The described closed loop cooling system assures that the cooling towers and water chillers will not be subject to biological growth or fouling inherent in the pasteurizer water due to beer spillage from broken bottles or leaking cans. When the tower fill material and the chiller tubes are kept clean, better operating efficiencies are realized to reduce energy consumption. Appropriate by-pass piping is included on the cooling and chilling heat exchangers 32 and 33, respectively, to allow all cooling to be accomplished in either heat exchanger if one source of external cooling is not available.

Returning to FIG. 1, the run-in mode will be described. When the next run-in commences hot product is not available in zone 20 to heat the spray water coming from the zone 11 sump. The water from the zone 20 sump being pumped to the zone 11 sprays must be externally heated to replace that heat normally provided by the hot product in zone 20. The water in the storage tank 31, which was recovered and stored during the previous run-out, is used to provide the heat necessary to elevate the temperature of the water being pumped to the zone 11 sprays. This is accomplished by pumping the water from the storage tank 31 through line 51 to the heat exchanger HE20 where it is used to heat up the water from the zone 20 sump being pumped to the zone 11 spray heads 21. When run-in is complete, the temperature of the water in the storage tank 31 will have been lowered to approximately the zone 11 spray temperature setting. Therefore. when cooling water is required for the next run-out it will be available from the storage tank 31. This represents a significant saving of energy that otherwise would have to be provided.

Figure 5:
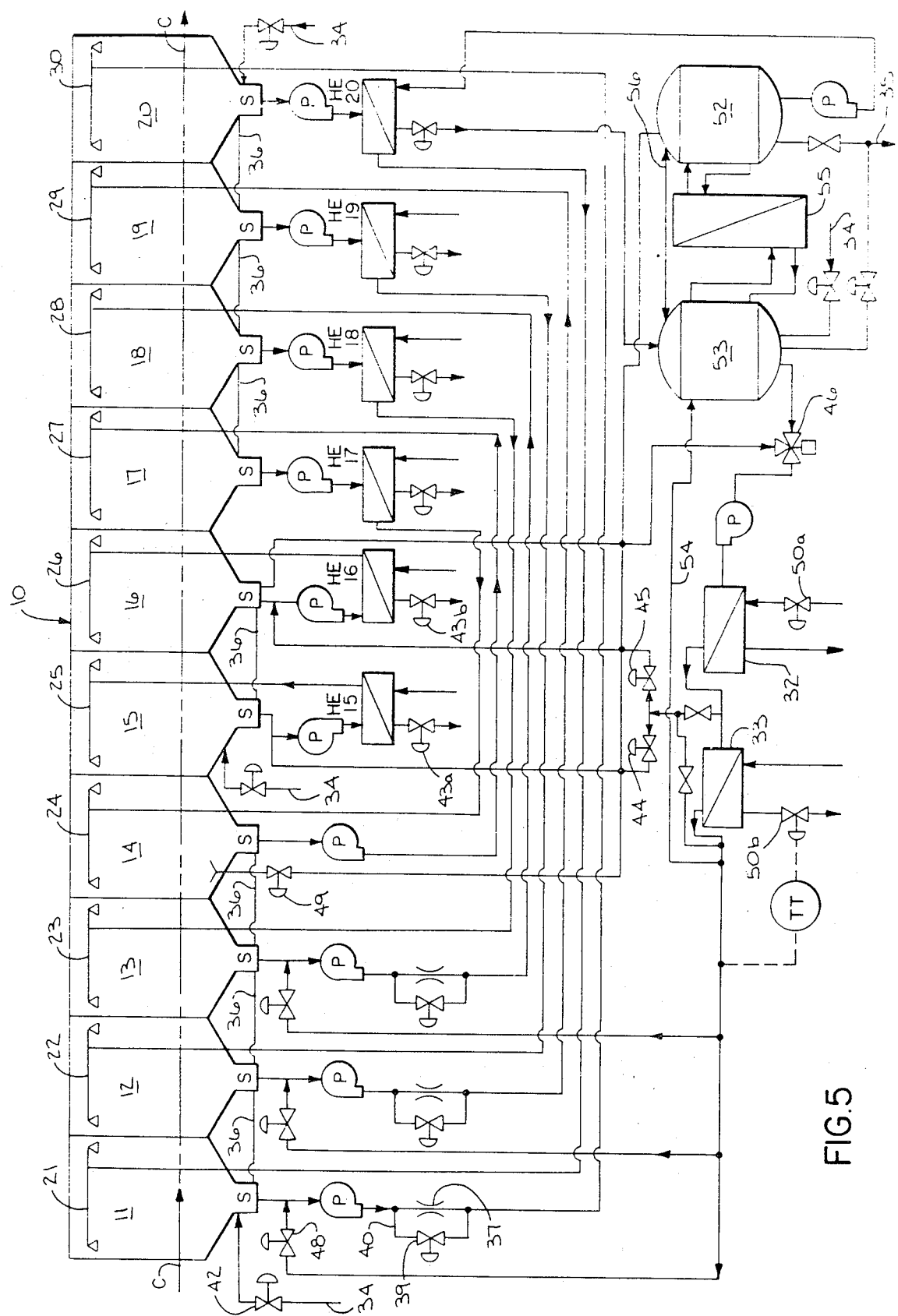
FIG. 5 is a schematic view of an alternate embodiment of a pasteurizer of the present invention.

In FIG. 5 another embodiment of the invention is shown in which there is a separate hot water storage tank 52 and a separate cold water storage tank 53 in place of the single storage tank 31 in the embodiment of FIG. 1. The use of such separate storage tanks may be preferred for some installations. In this embodiment, with two separate tanks for hot and cold water, the cooled water from tank 53 after cooling to about cooling tower water temperature in cooling heat exchanger 32 and passing through the now inactive chilling heat exchanger 33, is returned to tank 53 using line 54. The tanks 52 and 53 are preferably connected by an overflow pipe 56 to eliminate water loss from either of them. In the embodiment of FIG. 5, a heat pump 55 is provided which can be used to further cool the water in tank 53 while further heating the water in tank 52.

Figure 6:
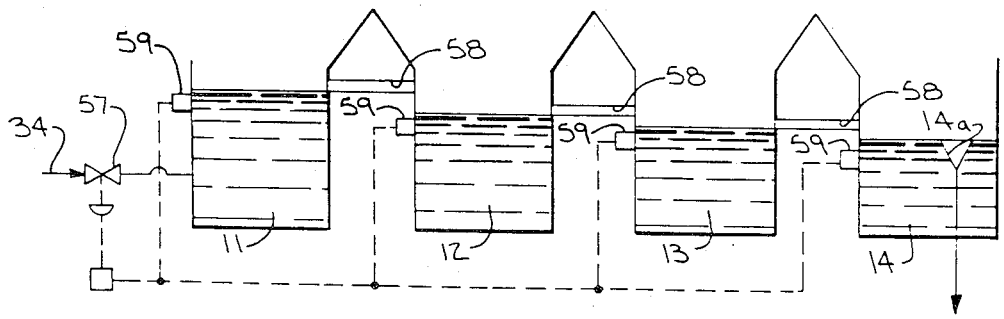
FIG. 6 is a schematic view showing an alternate arrangement of the innerconnecting pipes in the preheat sumps.

In FIG. 6, an alternate arrangement of the interconnecting pipes between the sumps of the preheat zones is shown which comprises a cascade type makeup water system. Such system permits filling from a single location in the preheat and precool zones and a makeup water addition from a single point in the preheat zones. The cascade system prevents the undesirable back flow of warmer water (i.e., from sump 14 to 13 to 12 to 11) when the water levels in the adjacent sumps are not equal. The elimination of the back flow prevents the cooler water in the preceding zone from being warmed by the warmer water thus providing a further energy saving.

The cascade water system includes a makeup water line 34 and an automatic control valve 57 which opens to inject water into the sump of zone 11. The makeup water fills the zone 11 sump and then overflows into the zone 12 sump. The zone 12 sump is filled before overflowing into the zone 13 sump and the zone 14 sump is filled in the same manner. Makeup water overflows from one zone to the next through innerconnecting pipes or weirs 58 in a cascading manner, i.e., the weir connecting sumps 11 and 12 is higher than the weir connecting sumps 12 and 13 and so on. Level sensors 59 are installed in each preheat sump, any one of which will activate the automatic makeup water level control valve 57 when a sump level drops to a predetermined low level.

It will be readily apparent to those skilled in the art that the foregoing description has been for purposes of illustration and that a number of changes and modifications may be made without departing from the spirit and scope of the invention. Therefore, it is to be understood that the scope of the invention is not to be limited except by the claims which follow:

We claim:

1. A method of preventing the over-pasteurization of a product in a container in a tunnel pasteurizer in which the container is conveyed on a conveyor through a heating zone, a pasteurizing zone and a cooling zone and in which over-pasteurization of the product can occur when the conveyor is stopped and the container remains too long in the pasteurizing zone, which method for preventing over-pasteurization comprises reducing the temperature of the product in the container in the pasteurizing zone to a temperature at which no appreciable pasteurization occurs when the conveyor has stopped.

2. The method of claim 1 in which the temperature of the product in the container in the pasteurizing zone when the conveyor stops is reduced by spraying the container with sufficient cooling water to lower the product temperature to a temperature at which no appreciable pasteurization occurs.

3. The method of claim 2 in which the cooling water sprayed on the container is obtained by cooling in a heat exchanger hot water which was previously used to heat the container in the pasteurizing zone.

* * * * *